L. L. WITTER
May 17, 1932. DIRIGIBLE ROAD LIGHT Re. 18,470
2 Sheets-Sheet 1
Original Filed Aug. 15, 1928
Fig. 1.
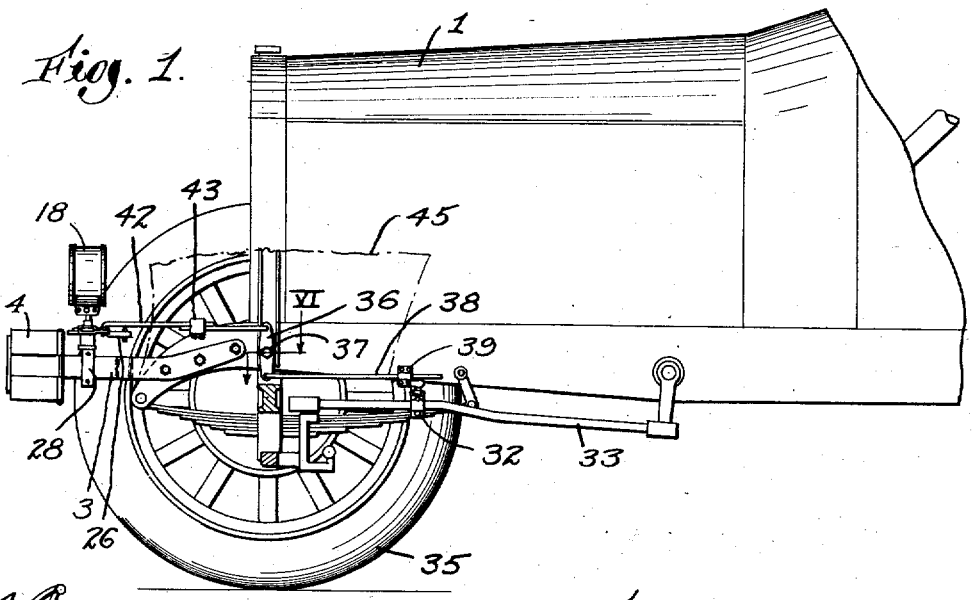
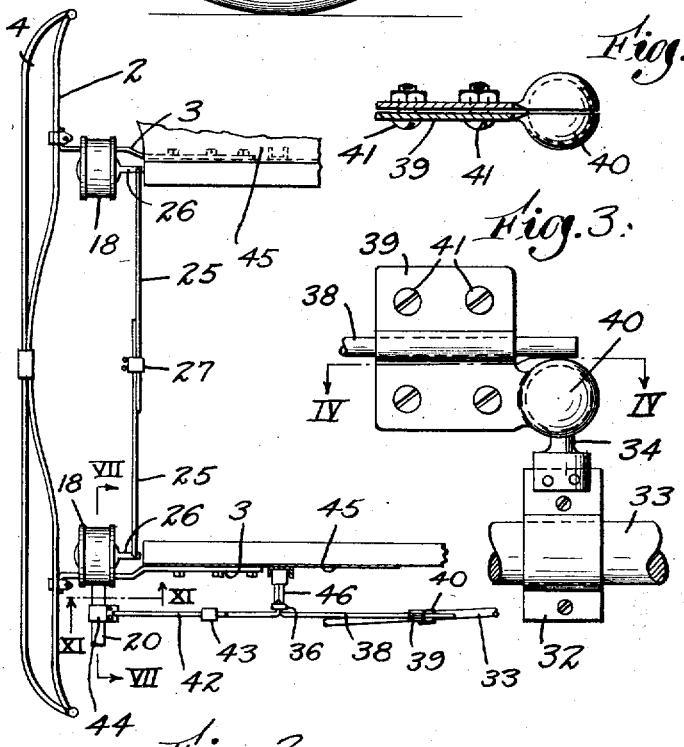
Fig. 2.
Fig. 4.
Fig. 3.
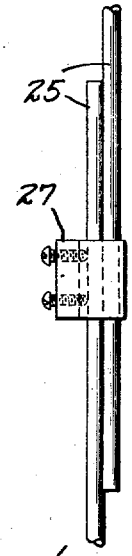
Fig. 5.
Fig. 6.
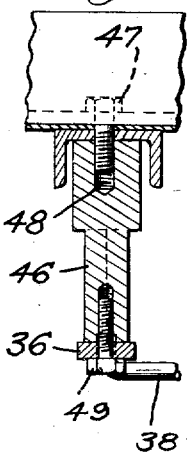
INVENTOR
Lawrence L. Witter L. L. WITTER
May 17, 1932. DIRIGIBLE ROAD LIGHT Re. 18,470
2 Sheets-Sheet 2
Original Filed Aug. 15, 1928
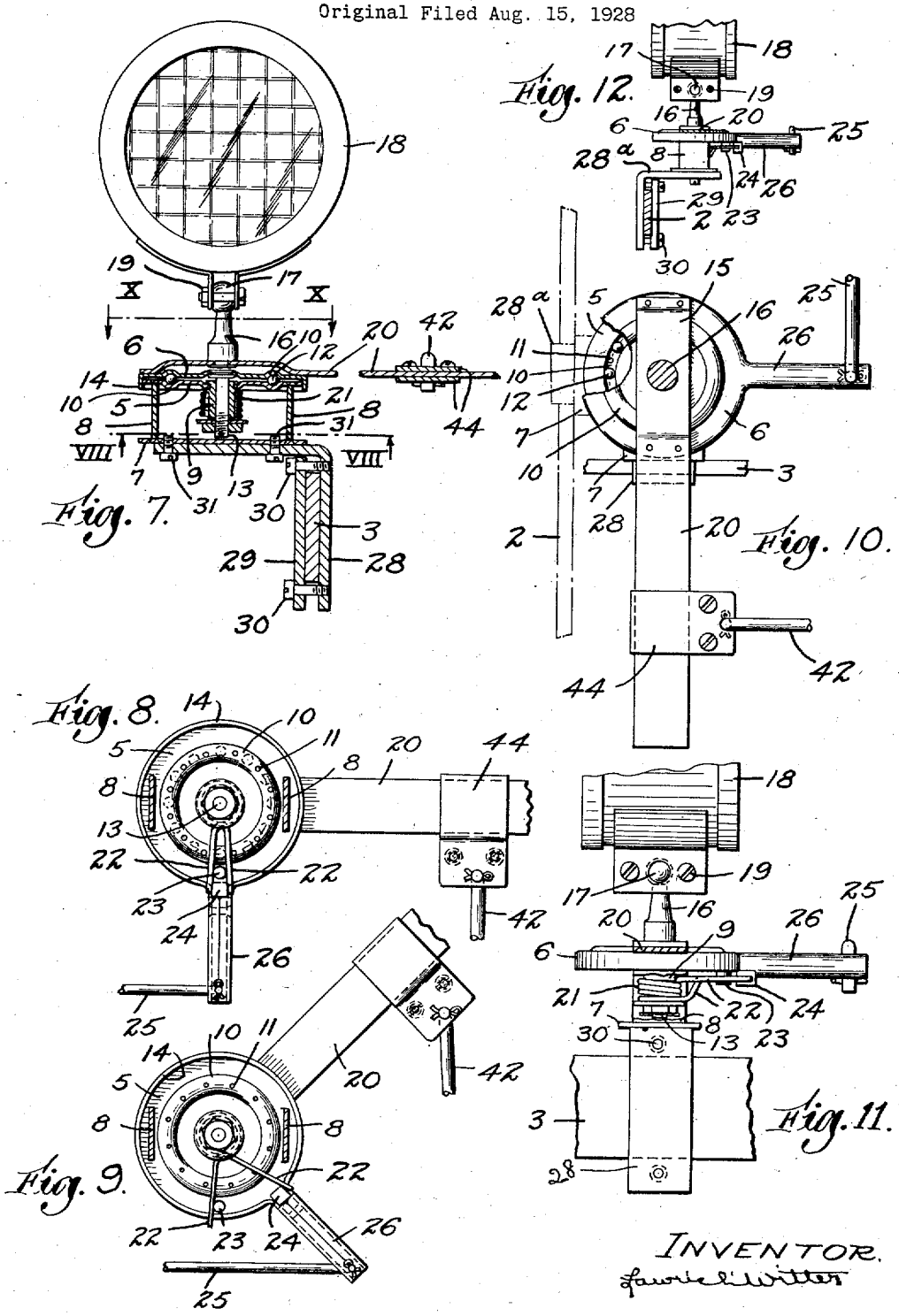
INVENTOR.
Laurie L. Witter Reissued May 17, 1932 Re. 18,470

UNITED STATES PATENT OFFICE

LAWRIE L. WITTER, OF JAMAICA PLAIN, MASSACHUSETTS

DIRIGIBLE ROAD LIGHT

Original No. 1,797,707, dated March 24, 1931, Serial No. 299,744, filed August 15, 1928. Application for reissue filed January 30, 1932. Serial No. 591,717.

This invention relates to automobile road lights of the dirigible type adapted to be automatically swiveled in a horizontal plane in conformity to the movement of the steering mechanism whereby to always illuminate the road in the direction in which the vehicle is moving. The light or lights are connected to and adapted to be turned by the steering mechanism and one object of the invention is to provide an improved and inexpensive mounting for the light and means in connection therewith for normally holding the light centered in a forwardly directed position and in a manner preventing vibration thereof.

When a dirigible road light is connected directly to the steering mechanism of a vehicle, the vibrations of such mechanism will be directly imparted to the road light through such connection unless means is provided for preventing the same. In my invention herein, I provide in connection with the light mounting, a simple resilient means acting directly on the swiveled portion of the light support and against the light swiveling action of the connection to the steering mechanism whereby to (1) return the light from positions imparted thereto by the steering mechanism, (2) automatically center the light to a normal and forwardly directed position, and (3) automatically take up the looseness in the connection to the steering mechanism whenever the light is turned in either direction from its intermediate position. This resilient means thereby serves these three functions.

It will furthermore be noted that my improved construction as illustrated in the accompanying drawings permits of very cheap manufacture from pressed sheet metal and is so designed as to form a housing completely shielding the parts from dust and grit. It is a further object of the invention to provide a dirigible road light having these improved features.

Another object of my invention resides in providing an improved dirigible road light of simple and cheap construction and of such standardized design that the same can be readily mounted on most vehicles now in operation by the use of simple tools and without requiring any drilling or machining operations on the vehicle, the invention including a light swiveling connection to the steering mechanism which passes around the forward end of the adjacent fender whereby to eliminate any necessity for cutting an opening through the fender or other part of the vehicle.

In the accompanying drawings I have illustrated certain specific embodiments of my invention but it will be understood that the invention can be otherwise embodied and that the drawings are not to be construed as defining or limiting the scope of the invention, the claims appended hereto being relied upon for that purpose.

Referring to the figures of the drawings:

Fig. 1 is a fragmentary side elevation of a vehicle equipped with my invention;

Fig. 2 is a partial plan view thereof;

Fig. 3 is an enlarged fragmentary side elevation of a connection shown in Fig. 1;

Fig. 4 is a sectional view therethrough taken on line IV—IV of Fig. 3;

Fig. 5 is an enlarged view of a clamping block shown in Figs. 1 and 2;

Fig. 6 is an enlarged sectional detail view taken on line VI—VI of Fig. 1;

Fig. 7 is a sectional view through the lamp mounting on line VII—VII of Fig. 2;

Fig. 8 is a bottom plan view taken on line VIII—VIII of Fig. 7;

Fig. 9 is like Fig. 8 but shows the parts in the turned position;

Fig. 10 is a plan view taken on line X—X of Fig. 7;

Fig. 11 is a side view taken on line XI—XI of Fig. 2;

Fig. 12 is a side view similar to Fig. 11 but showing the light mounted on the transverse bumper bar 2.

I am aware that dirigible road lights for automobiles are not broadly new and that various mechanisms for providing the same on automobiles have heretofore been suggested. All of such mechanisms, however, as far as I am aware, have been of a complex and expensive nature and their installation on automobiles has been an expensive and technical job requiring considerable machining and fitting. I have devised and disclose herein a simple road light mechanism which can be very quickly and easily attached to substantially any automobile now in use and without resorting to any special tools or machining of the vehicle. I will now proceed with a description of the specific mechanism illustrated in the drawings, it being understood that the same illustrates one embodiment of the invention and that the scope of the latter is defined by the appended claims.

Substantially every automobile now in use is provided with a front bumper and this bumper is rigidly secured to the chassis forwardly of the fenders. In the accompanying drawings I have illustrated a standard type of bumper thus secured to the automobile 1. This bumper comprises a transversely extending bar 2 supported by a pair of arms 3 bolted to the chassis. The spring elements 4 of the bumper are carried by the bar 2. The invention as illustrated contemplates a lamp mounting of such simple construction as to be adapted to be readily clamped to any bumpers of this general type.

This lamp mounting comprises broadly a fixed base portion or member 5 on which is swivelly mounted a lamp carrying portion 6. The base portion 5 is rigidly carried on and secured to a plate 7 by means of a pair of spacer plates 8 having their ends riveted, welded or otherwise secured to plates 5 and 7. A central downwardly extending hub 9 is secured to the portion 5 and is provided with a central hole therethrough. The adjacent faces of the portions 5 and 6 are provided with cooperating ball races 10 therein, the portion 5 being provided with pins 11 therein for keeping the balls 12 properly spaced and separated.

The swiveled member 6 carries a central downwardly extending stud 13 for engaging within the hub 9 and the circumferential edge 14 of this member is bent down in a manner cupping over and completely housing the member 5. Riveted or otherwise secured to the top of each member 6 is a plate 15 and mounted on each such plate directly in line with the stud 13 is a post 16 having a ball end 17. The light 18 is supported on this ball. It will be understood that the light can be properly adjusted on the ball and then set in such position by tightening the nuts 19. The plate 15 on the left hand light support is extended outwardly at 20 to serve as a connection to the steering mechanism.

I have provided novel and inexpensive means for normally holding the swiveled member 6 in a fixed position relative to the fixed member 5. This means is a spring 21 coiled about the hub 9 and having a pair of arms 22 extending radially outward therefrom and engaging opposite sides of a pair of lugs 23 and 24 respectively carried by the member 5 and 6. In the normal position shown in Fig. 8, these spring arms hold the member 6 in fixed position relative to the member 5. Turning of the member 6 in either direction (Fig. 9) is against the action of the spring, it being noted that the lug 24 moves one arm while the other arm is held by the fixed lug 23. The light 18 is so mounted on the ball 17 that the light is directed forwardly when the parts are in the normal position shown in Fig. 8.

The two lights are connected by an adjustable rod member 25 having its ends connected to rearward extensions 26 on the swiveled member 6. The rod member comprises two rods clamped together by a clamp 27. It will be understood that the two lamps thus connected will operate in unison.

As illustrated in the drawings, each lamp mounting is secured to its respective bumper arm 3 by a very simple clamping means comprising an angle plate 28 and a cooperating plate 29. One arm of the angle plate is engaged against the outer side of its bumper arm 3 in such position that the other arm thereof extends horizontally inward over the bumper arm. The angle plate is secured in such position by screws 30 which pass through the plate 29 to the opposite side of the bumper arm and thread into the plate 28. The part 7 of the lamp support is seated on the horizontal portion of the angle plate and is so secured thereto by screws 31. The lamp mounting is thus secured rigidly to the chassis of the vehicle.

The connections from the arm 20 to the steering mechanism and through which the light is turned against the action of the spring 21 will now be described. In the drawings I have preferred to illustrate this mechanism as operative to turn the light in both directions from a centrally disposed position. The illustrated mechanism comprises a clamp 32 adapted to be secured to the steering rod 33 of the vehicle and carrying a ball member 34 on its upper end. Connections hereinafter described are provided between this ball and the arm 20 whereby as the steering rod moves forwardly and backwardly the lights will be turned in accordance therewith. When thus connected, forward movement of the steering rod turns the wheels 35 to the left and if a direct connection were made to the arm 20 the lights would be turned to the right. Obviously the lights must be turned in the same direction as the wheels and a reversing means is therefore required in this connection. As such a reversing means, I provide a lever 36 pivoted at 37.

A rod 38 has one end connected to the lower end of lever 36 and is provided with a clamp 39 adjustable along the other end. This clamp carries a socket portion 40 for engaging the ball 34 and forming a universal joint therewith. When the clamp is adjusted to the proper position on the rod the same can be set in such position by tightening the screws 41. A rod member 42 adjustable by means of a clamp 43, similar to the clamp 27, connects the upper end of the lever with a clamp 44 slidably adjustable on the arm 20. The extent of throw imparted to the lamps by the steering mechanism can be varied as desired by adjusting the clamp 44 along the arm and the clamp can be secured in such adjusted position by a pair of screws provided therein.

It will be noted that by mounting the lamps on the bumper the same are positioned forwardly of the car fenders 45. Thus locating the lamps permits the extending of the arm 20 outwardly to a position in a direct unobstructed line with the connection to the steering mechanism. In dirigible lights heretofore suggested, the lamps have been mounted between the two fenders in a manner requiring special expensive connections, considerable work and special machining to provide a connection through the fenders or other parts to the steering mechanism, whereas in accordance with my invention the connection to the steering mechanism is extended around the forward end of the fender in a manner eliminating any necessity for machining or otherwise damaging the vehicle.

As has been heretofore stated, one important feature of my invention is that the device can be mounted on the vehicle by simple tools and without any machining. In accomplishing this object the providing of a pivot support for the lever 36 presented some problem since ordinarily a bracket would need to be provided on the chassis for this purpose and the mounting of such a bracket would require machining and the services of a mechanic. This problem has been very simply solved by providing a stud adapted to be mounted on the vehicle by threaded contact with a standard part of the vehicle, such as the stud 46 illustrated in Fig. 6 as threaded directly onto a chassis or body bolt 47 of the vehicle. This stud has a large base end provided with a threaded socket 48 to receive this bolt. In mounting the stud, the nut is removed from the bolt and the stud threaded in its stead. The stud thereupon serves the functions of both the nut and the lever pivot support. The outer end of the stud has a threaded socket receiving a pivot screw 49 extending through the lever.

The lamps supporting clamps and other parts of the mechanism can be varied sufficiently to adapt the road light set to fit any and all of the standard automobiles. For example, in those cars equipped with bumpers which are not provided with the supporting arms 3, the clamp support can be mounted on the bar 2. This manner of mounting is illustrated in Fig. 12 and in dot and dash lines in Fig. 10, the angle plate of the clamp being indicated by reference character 28*a*. The lamps may be thus mounted in the most convenient manner and location so long as their mounting is on or adjacent to a supporting arm 3 of the bumper, whereby the lamps will not partake of the vibration which they would otherwise receive were they mounted on a more remote part of the bumper.

It is believed that the operation and advantages of my invention will be apparent without further description. Particular emphasis is, however, directed to the following features. Substantially all the parts are adapted to be made from flat or round stock by simple methods, thus providing very cheap manufacture. The design of the parts, relative to the vehicle with which they are adapted to be used, is such that the same set with little variations can be made to fit substantially all automobiles. The design and construction is such that the set can be mounted on a car by any owner by the use of only a screw driver and wrench and without any machining whatever. All parts are made so adjustable that they can be readily set to the proper length of position to serve the functions intended. The swiveled portion of the mounting is completely housed, thus eliminating grit and dirt. The spring 21 is inexpensive and serves its functions with great facility. The lights are mounted in a position directly behind the forward portion of the bumper where they are protected from damage.

It will be obvious that there is a certain amount of looseness in the connection from the arm 20 to the clamp 32 whereby when the steering mechanism is in the forward position the springs 21 will automatically center the lamps forwardly and hold the same so directed. When the steering mechanism is turned in one direction or the other the lamps will be turned against the action of the springs 21, and on the return movement the springs will function to follow up the movement of the mechanism. In this manner the springs serve to hold the lights directed forwardly when the steering mechanism is in the forward position and serve to resiliently take up any looseness in the connections and prevent vibration of the lamps when the steering mechanism is turned. It will be obvious that since the lamps turn with the steering mechanism the lamps will at all times light the road in the direction in which the front wheels are pointed.

I claim:

1. A dirigible light for automobiles, comprising the combination of a supporting member, a cooperating light supporting member mounted on the first member for pivotal movement thereon in a horizontal plane, clamping means cooperating with the first member and adapted to secure the same to the bumper on or adjacent to a supporting arm thereof forwardly of and at least partially laterally inside the adjacent fender, means connected to the second named member and extending outwardly to a position forwardly of and laterally outside the said fender, and means for connecting the last named means with the steering mechanism in such manner as to automatically pivot the second named member in the same direction as the steering mechanism moves the front wheels.

2. A dirigible light for automobiles, comprising the combination of a supporting member adapted to be mounted on the forward end of a vehicle, a light supporting member mounted on the first member for pivotal movement thereon about a vertical axis, a single spring having two ends cooperating directly with the members to normally hold the light supporting member in a predetermined position by direct action of the spring thereon, and means for connecting the pivotal member to the steering mechanism and adapted to automatically pivot the same in opposite directions in accordance with the movement of the steering mechanism, such pivotal movement in either direction acting against the resiliency of the spring by moving the same from its normal position.

3. A dirigible light for automobiles, comprising the combination of a supporting member adapted to be mounted on the forward end of a vehicle, a light supporting member mounted on the first member for pivotal movement thereon about a vertical axis, a spring mounted coaxially of the said vertical axis and acting directly on the light supporting member to normally hold the same in a predetermined position, and means for connecting the pivotal member to the steering mechanism and adapted to automatically pivot the same in opposite directions in accordance with the movement of the steering mechanism, such pivotal movement in either direction acting against the resiliency of the spring by moving the same from its normal position.

4. A dirigible light for automobiles, comprising the combination of a supporting member adapted to be mounted on the forward end of a vehicle, a light supporting member mounted on the first member for pivotal movement thereon about a vertical axis, a spring having a coiled portion at the pivotal axis of the members and two arms radiating therefrom, two lugs respectively carried by the two members and extending between the two arms in a manner normally holding the light supporting member in a predetermined position, and means for connecting the pivotal member to the steering mechanism and adapted to automatically pivot the same in opposite directions in accordance with the movement of the steering mechanism, such pivotal movement acting against the normal position of the spring by spreading the arms thereof.

5. A pair of lights mounted for horizontal dirigible rotation on a bumper respectively adjacent to its supporting connections to an automobile, means extending between the fenders and connecting the lights for unitary dirigible movement, an arm rigidly connected to one of the lights and extending outwardly therefrom forwardly of and laterally outside the adjacent fender to a position directly forward of the steering mechanism, and means for connecting the arm with the steering mechanism in such manner as automatically to pivot the lights in the same direction as the steering mechanism moves the front wheels.

6. A dirigible light for motor vehicles, comprising the combination of a pair of formed sheet metal members, one such member having a bore extending therethrough, said member being adapted to be mounted on the vehicle, the other member being mounted on the first member for pivotal movement about the longitudinal axis of the said bore and being cupped shape in a manner forming a housing for the first member, means including a pin extending through the bore for holding the two members together, light supporting means on the movable member, means for connecting the movable member with the steering mechanism in such manner as automatically to pivot such member in the same direction as the steering mechanism moves the front wheels, and resilient means acting on the movable member to oppose said movement thereof by the steering mechanism.

7. A dirigible light for motor vehicles, comprising the combination of a pair of formed sheet metal members, one such member being adapted to be mounted on the vehicle, the other member being mounted on the first member for pivotal movement about a vertical axis and being cupped shape in a manner forming a housing for the first member, cooperating ball raceways pressed into the cooperating faces of the two members, anti-friction balls in such raceways, light supporting means on the movable member, means for connecting the movable member with the steering mechanism in such manner as automatically to pivot such member in the same direction as the steering mechanism moves the front wheels, and resilient means acting on the cupped member to oppose said movement thereof by the steering mechanism.

8. A dirigible light for motor vehicles, comprising the combination of a pair of formed sheet metal members, one such member being adapted to be mounted on the vehicle, the other member being mounted on the first member for pivotal movement about a vertical axis and cupping over and housing the first member, anti-friction means between the two members and about said axis, means extending along said axis and holding the two members together, means for connecting the movable member with the steering mechanism in such manner as automatically to pivot such member in the same direction as the steering mechanism moves the front wheels, and a spring coiled about the second named means and acting on the movable member to oppose said movement thereof by the steering mechanism.

9. A dirigible light for motor vehicles, comprising the combination of a pair of formed sheet metal members, one of said members being adapted to be mounted on the forward end of a vehicle between the fenders thereof, the other member being mounted on the first member for pivotal movement thereon about a vertical axis and cupping over and housing the first member, means including a bolt at said axis for holding the second member to the first member, means adapted to extend around the forward end of a fender and connect the second member to the steering mechanism, and a spring surrounding the bolt and operative on the second member to oppose pivotal movement thereof by said connection and return said member from positions imparted thereto by the steering mechanism through said connection.

In testimony whereof I affix my signature, this 29th day of February, 1932.

LAWRIE L. WITTER.